US012348921B2

(12) United States Patent
Marron-Baez et al.

(10) Patent No.: US 12,348,921 B2
(45) Date of Patent: *Jul. 1, 2025

(54) HIGH PRESSURE WATER PROTECTION SPEAKER OR MICROPHONE

(71) Applicant: Continental Automotive Systems, Inc., Auburn Hills, MI (US)

(72) Inventors: David Marron-Baez, Zapopan (MX); Irving Morales Rodriguez, Guadalajara (MX); Enrique Chavez Luna, Guadalajara (MX); Ian McKerlich, Seattle, WA (US)

(73) Assignee: Continental Automotive Systems, Inc., Auburn Hills, MI (US)

(*) Notice: Subject to any disclaimer, the term of this patent is extended or adjusted under 35 U.S.C. 154(b) by 187 days.

This patent is subject to a terminal disclaimer.

(21) Appl. No.: 17/822,498

(22) Filed: Aug. 26, 2022

(65) Prior Publication Data

US 2022/0417627 A1    Dec. 29, 2022

Related U.S. Application Data

(63) Continuation-in-part of application No. 16/692,055, filed on Nov. 22, 2019, now Pat. No. 11,457,295.

(51) Int. Cl.
*H04R 1/02* (2006.01)
*B60R 11/02* (2006.01)
*H04R 1/08* (2006.01)

(52) U.S. Cl.
CPC .......... *H04R 1/086* (2013.01); *B60R 11/0247* (2013.01); *H04R 1/023* (2013.01); *H04R 1/025* (2013.01); *H04R 2499/13* (2013.01)

(58) Field of Classification Search
CPC ...... B60R 11/0217; H04R 1/023; H04R 1/086
USPC ........... 296/1.07; 381/334, 87, 332, 336, 91; 181/149, 153
See application file for complete search history.

(56) References Cited

U.S. PATENT DOCUMENTS

| 3,679,023 A | 7/1972 | Rankin |
| 3,909,530 A | 9/1975 | Gosswiller |
| 3,989,909 A | 11/1976 | Hodsdon et al. |
| 7,840,021 B2 | 11/2010 | Greco et al. |
| 9,873,375 B2 * | 1/2018 | Matsubara ....... G10K 11/17855 |
| 11,202,135 B2 | 12/2021 | Vavron |
| 11,310,578 B2 * | 4/2022 | Kleinheincz ............. H04R 1/04 |
| 11,457,295 B2 * | 9/2022 | Baez ....................... B60K 35/60 |

(Continued)

FOREIGN PATENT DOCUMENTS

| DE | 1487317 A1 | 4/1969 |
| FR | 2748627 A1 | 11/1997 |
| WO | 2018043224 A1 | 3/2018 |

OTHER PUBLICATIONS

Office Action dated Feb. 15, 2022 from corresponding U.S. Appl. No. 16/692,055.

*Primary Examiner* — Dennis H Pedder (57) ABSTRACT

A vehicle assembly includes a panel or mounting location, a speaker or microphone disposed within the panel for generating or detecting sounds and a cover disposed over the speaker. The cover includes a plurality of openings for the transmission of sound and a corresponding plurality of blockers at each of the plurality of openings. Each of the plurality of blockers includes a front face that is spaced apart forward of a corresponding one of the plurality of openings for blocking water intrusion.

14 Claims, 7 Drawing Sheets

(56) References Cited

U.S. PATENT DOCUMENTS

| | | |
|---|---|---|
| 2006/0177089 A1 | 8/2006 | Greco et al. |
| 2019/0149934 A1* | 5/2019 | Fischer ................ H04R 29/004 381/56 |
| 2019/0200110 A1 | 6/2019 | Kajihara et al. |

\* cited by examiner

HIGH PRESSURE WATER PROTECTION SPEAKER OR MICROPHONE

TECHNICAL FIELD

The present disclosure relates to speakers microphones for vehicles that are rated for exposure to severe environmental conditions and direct application of a high pressure stream.

BACKGROUND

Vehicles that have speakers, microphone or other devices are designed for exposure to severe weather including wind and rain. The speaker may provide audible feedback and warnings to an operator or others proximate to the vehicle. Microphones can detect sounds from the vehicle or the surrounding environment. Weather proofing structures that protect the speakers/microphone against harsh environments can limit the range of sounds that can be produced. Additionally, some speakers and microphones are designed to withstand direct application of water pressure to accommodate high pressure washing of a vehicle. The additional structures required to accommodate high pressure application of water can also reduce the range of sounds capable of being reasonably produced by a speaker or detected by a microphone.

Vehicle and component manufacturers continually seek ways to improve product performance and capabilities.

SUMMARY

A vehicle according to a non-limiting example embodiment includes, a mounting location on an external location of the vehicle; one of a speaker and a microphone disposed within the mounting location for generating sounds; a cover disposed over the speaker, the cover including a plurality of openings for the transmission of sound and a corresponding plurality of blockers at each of the plurality of openings, each of the plurality of blockers includes a front face that is semi-circular with a radius corresponding to a radius of a corresponding one of the plurality of openings and is spaced apart forward of the corresponding one of the plurality of openings for blocking water intrusion.

Implementations may include one or more of the following features.

In one example, the blocker defines a passage between a corresponding one of the plurality of openings, the passage including a first portion that extends forward from the opening and a second portion that is transverse to the first portion.

In one example, the blocker includes a first side and a second side that at least partially defines the first portion of the passage.

In one example, the front face is disposed on the first side and extends over the first portion of the passage.

In one example, the second side is shorter than the first side and the second portion of the passage is disposed between an end of the second side and the front face.

In one example, the one of a speaker and a microphone is a microphone and the microphone is positioned to detect noise, vibration or harshness from vehicle components.

In one example, the one of a speaker and a microphone is a microphone and where the microphone is positioned to detect noise from the environment proximate to the vehicle.

In another general example, an external speaker assembly for a vehicle. includes a speaker for generating sounds; a cover disposed over the speaker, the cover including a plurality of openings for the transmission of sound and a corresponding plurality of blockers at each of the plurality of openings, each of the plurality of blockers includes a front face that is semi-circular with a radius corresponding to a radius of a corresponding one of the plurality of openings and is spaced apart forward of the corresponding one of the plurality of openings for blocking water intrusion.

Implementations may include one or more of the following features.

In one example, the speaker assembly as recited where the blocker defines a passage between a corresponding one of the plurality of openings, the passage including a first portion that extends forward from the opening and a second portion that is transverse to the first portion.

In one example, the blocker includes a first side and a second side that at least partially defines the first portion of the passage.

In one example, the front face is disposed on the first side and extends over the first portion of the passage.

In one example, the second side is shorter than the first side and the second portion of the passage is disposed between an end of the second side and the front face.

In another general example, an external microphone assembly for a vehicle. The external microphone assembly also includes a microphone for detecting sounds; a cover disposed over the microphone, the cover including a plurality of openings for the transmission of sound and a corresponding plurality of blockers at each of the plurality of openings, each of the plurality of blockers includes a front face that is semi-circular with a radius corresponding to a radius of a corresponding one of the plurality of openings and is spaced apart forward of the corresponding one of the plurality of openings for blocking water intrusion.

Implementations may include one or more of the following features.

In one example, the microphone assembly as recited where the blocker defines a passage between a corresponding one of the plurality of openings, the passage including a first portion that extends forward from the opening and a second portion that is transverse to the first portion.

In one example, the blocker includes a first side and a second side that at least partially defines the first portion of the passage.

In one example, the front face is disposed on the first side and extends over the first portion of the passage.

In one example, the second side is shorter than the first side and the second portion of the passage is disposed between an end of the second side and the front face.

In one example, the microphone is positioned to detect noise, vibration or harshness from vehicle components.

In one example, the microphone is positioned to detect noise from the environment proximate to the vehicle.

Although the different examples have the specific components shown in the illustrations, embodiments of this disclosure are not limited to those particular combinations. It is possible to use some of the components or features from one of the examples in combination with features or components from another one of the examples.

These and other features disclosed herein can be best understood from the following specification and drawings, the following of which is a brief description.

DETAILED DESCRIPTION

Figure 1:
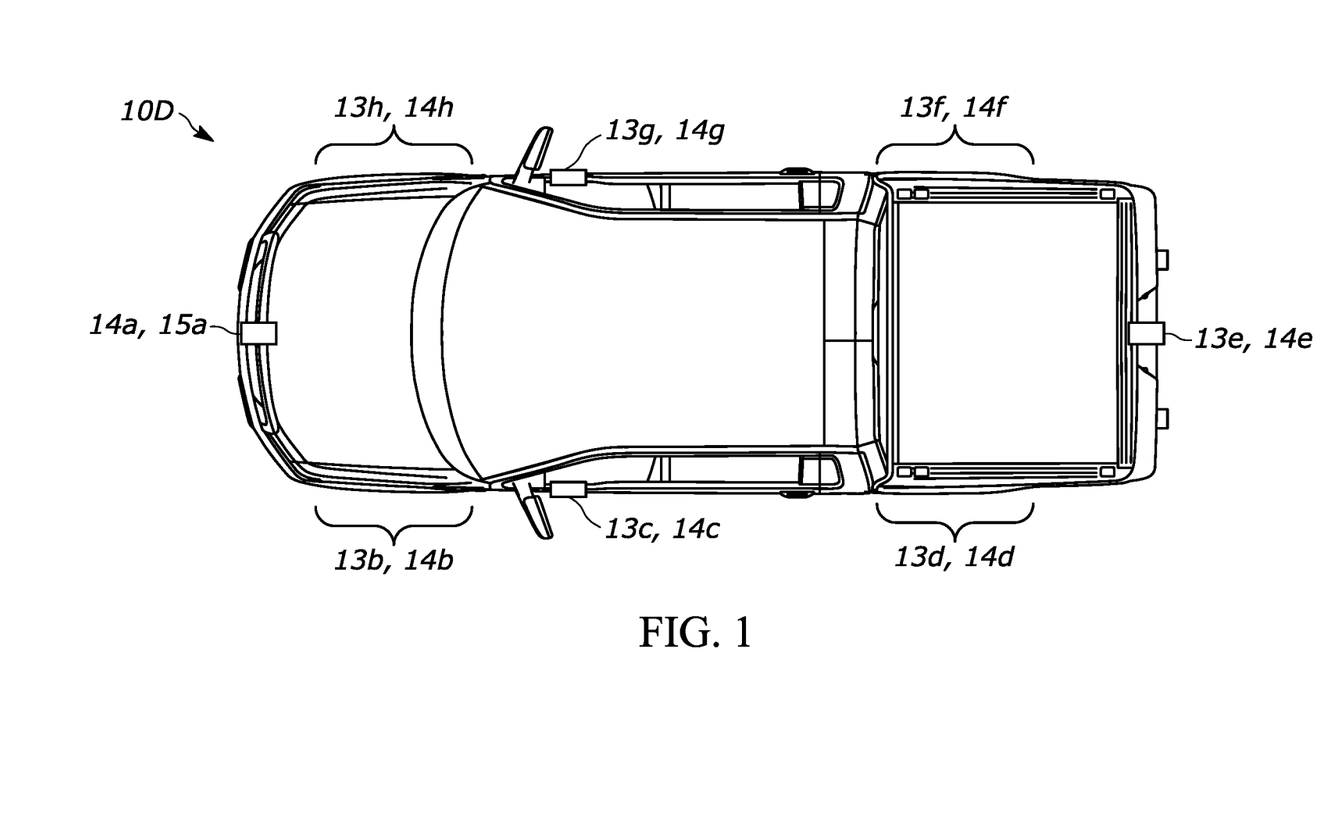
FIG. 1 is a schematic view of several example vehicles and an example instrument panel assembly configured for exposure to an outside environment.
Figure 2:
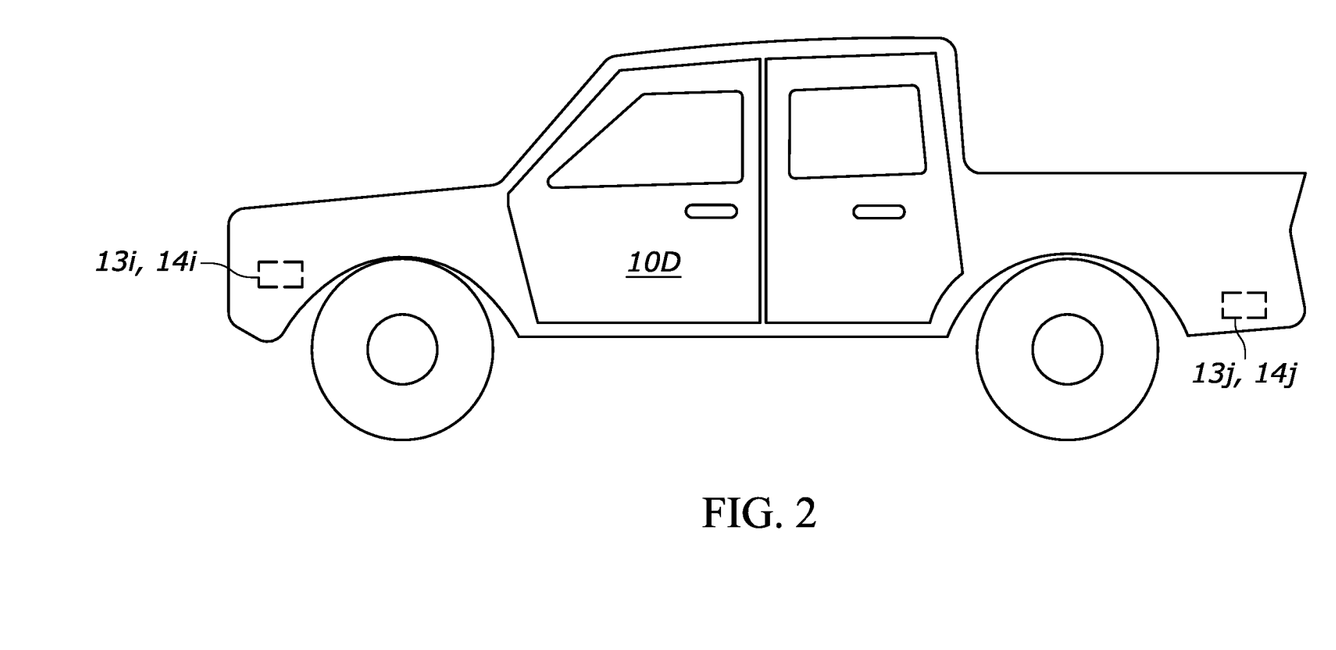
FIG. 2 is a side view of an example speaker assembly embodiment.
Figure 3:
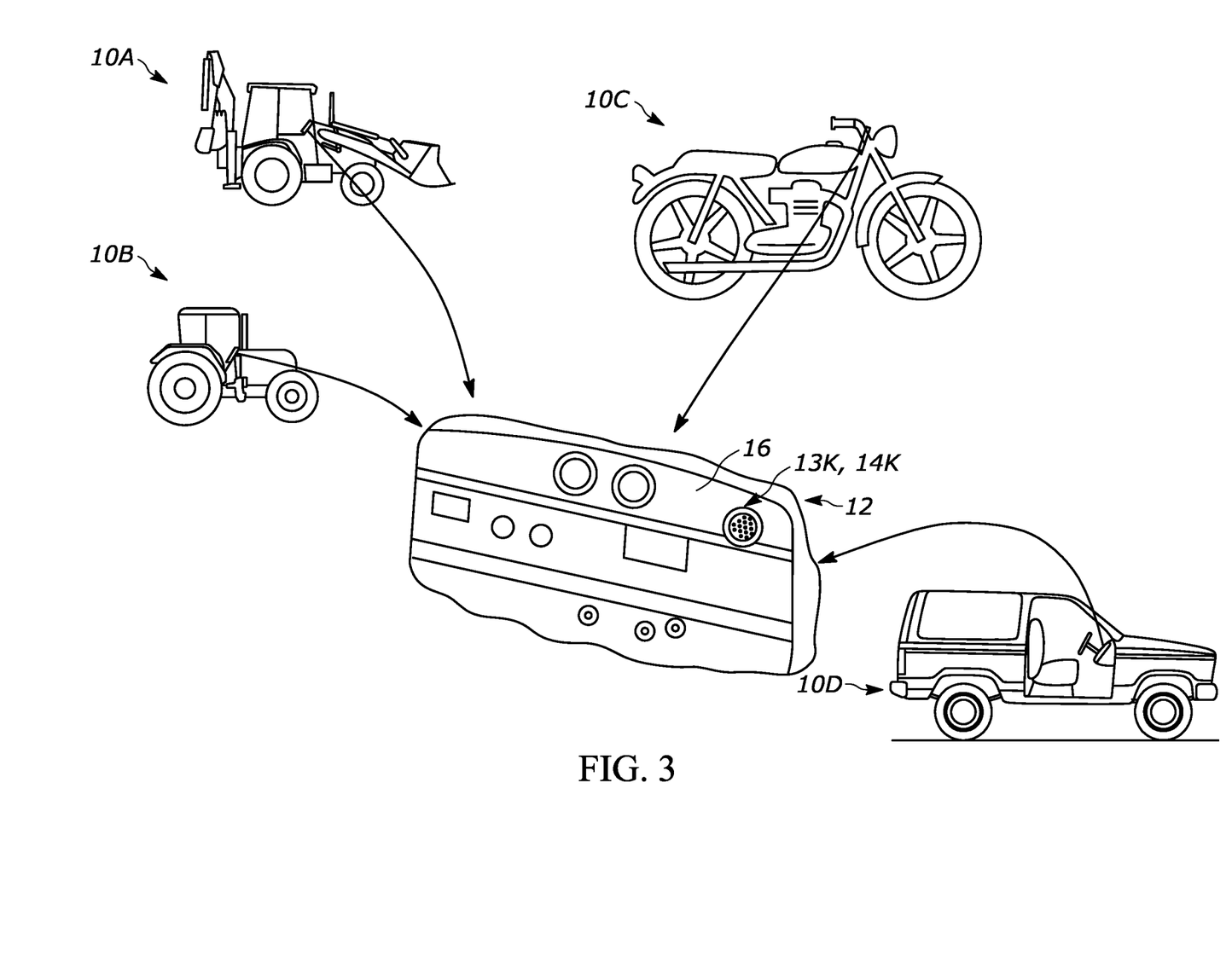
FIG. 3 is a schematic view of several example vehicles and an example instrument panel assembly configured for exposure to an outside environment.

Referring to FIGS. 1-3, vehicles 10a-d have a variety of external locations that are exposed to weather and the elements. The vehicles are shown as farm equipment 10a, 10b, a motorcycle 10c and/or a truck 10d or other commercial vehicle. As vehicles 10a-d become more autonomous the need for external sensors and devices is becoming necessary. In particular, microphones assemblies 13a-k and speaker assemblies 14a-k not previously needed to interact with external environment may be desired. For example, microphones may listen for noises that may provide information about the area in proximity to the vehicle, e.g. for emergency vehicles, or to listed for noise, vibration and hardness of vehicle components. Speakers may be used to communicate with nearby pedestrians for safety reasons. Other types of sensors and devices mounted in a location on a vehicle that is exposed to water and other elements may also benefit from the protection as described herein.

FIGS. 1-3 illustrate a variety of vehicles 10a-d which show various locations that the microphones assemblies 13a-k and speaker assemblies 14a-k may be located on the exterior of the vehicles 10a-d.

A standard for waterproof devices classifies varying degrees of capabilities for operating upon exposure to the weather and water. One level of classification requires that the speaker assembly 14 remain operable upon exposure to a direct jet of water. The standard is know as the "IP" standard as is a standard drawn up by the International Electrotechnical Commission (IEC) 60529. The IP is a standard to determine and classify how resistant an electrical device, such as a speaker, is to fresh water and common contaminants such as dirt dust and sand. The first digit after the "IP" is the resistance level to solids and the second digit is the water resistance level. The classification known as IP standard corresponds with a capability to maintain operation after exposure to a direct high pressure water and steam-jet cleaning. The disclosed speaker assembly 14 includes features for meeting the requirements of the IP classification.

Referring to FIG. 3, vehicles that have an instrument panel that is exposed to weather and the elements are schematically shown at 10a, 10b and 10c. The vehicles are shown as farm equipment 10a, 10b, a motorcycle 10c and/or a truck 10d or other commercial vehicle that have instrument panels that are exposed to the elements and facing a driver. The example instrument panel 12 can include various devices and controls and additionally the microphones assemblies 13a-k and speaker assemblies 14a-k. The microphones assemblies 13a-k and speaker assemblies 14a-k provide for a vehicle operator to have handsfree communication and the generation of audible alerts to the operator.

Figure 4:
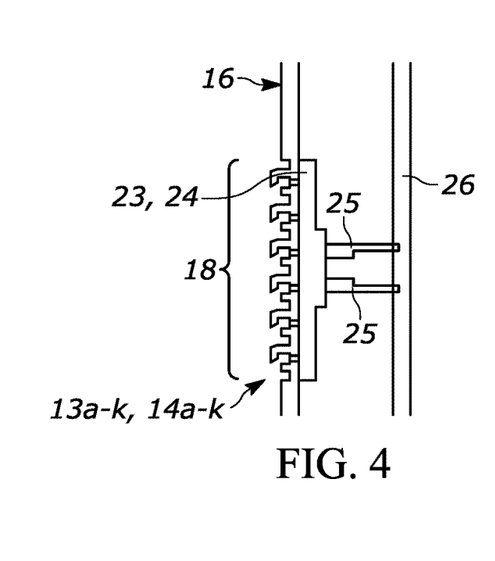
FIG. 4 is a side view of an example speaker assembly embodiment.
Figure 5:
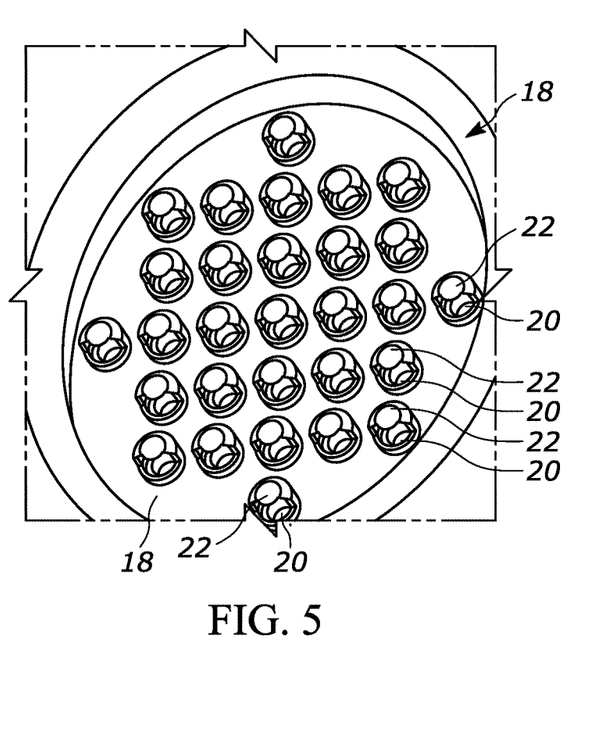
FIG. 5 is a perspective view of a cover of the example speaker assembly.

Referring to FIGS. 4 and 5 with continued reference to FIGS. 1-3, the instrument panel or other mounting location 12 which includes a front panel 16. The microphones assemblies 13a-k and speaker assemblies 14a-k includes a cover 18 that in one disclosed example is an integral portion of the front panel 16. In another disclosed embodiment, the cover 18 is a portion separate from the front panel 16. The cover 18 is a plastic molded part that is assembled over a microphone 23 or a speaker 24 or that is powered by connections 25 to a printed circuit board 26 in this example embodiment. As appreciated, the microphone/speaker 23, 24 may be connected in any manner to a power source within the scope and contemplation of this disclosure. The microphone/speaker 23, 24 is of a waterproof configuration that is sufficient to maintain operation upon limited exposure to water. However, the example microphone/speaker 23, 24 is not configured to withstand the direct application of a high pressure stream of water.

Accordingly, the cover 18 includes features that prevent direct application of high pressure water against the microphone/speaker 23, 24. The cover 18 includes a plurality of openings 20 to enable the propagation of sound. Each of the openings 20 are at least partially covered by a blocker 22. The blocker 22 is an integral part of the cover 18 and defines a tortuous path to the corresponding opening 20 that prevents high pressure water from directing impacting the microphone/speaker 23, 24.

Figure 6:
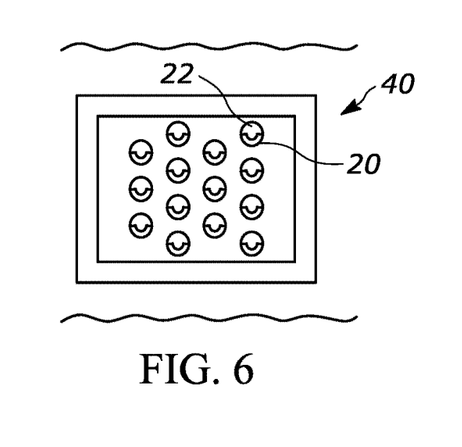
FIG. 6 is an enlarged view of another speaker assembly embodiment.

The disclosed cover 18 is round and includes the plurality of openings 20 and blockers 22 orientated within a circular perimeter. However, the example speaker cover 18 may also be other shapes such as rectangular as is indicated at 40 in FIG. 6. The openings 20 and blockers 22 can be the same as disclosed in FIG. 5. Moreover, although round opening 20 and curved blockers 22 are disclosed by way of example, other shapes could be utilized and are within the contemplation and scope of this disclosure.

Figure 7:
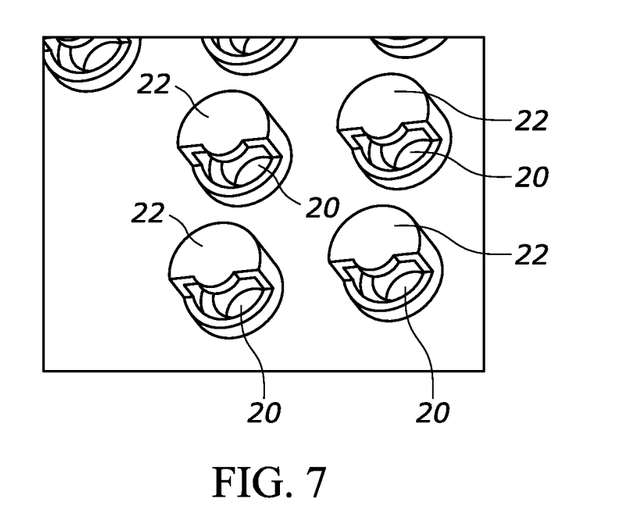
FIG. 7 is a perspective view of openings through an example cover for a speaker assembly.
Figure 8:
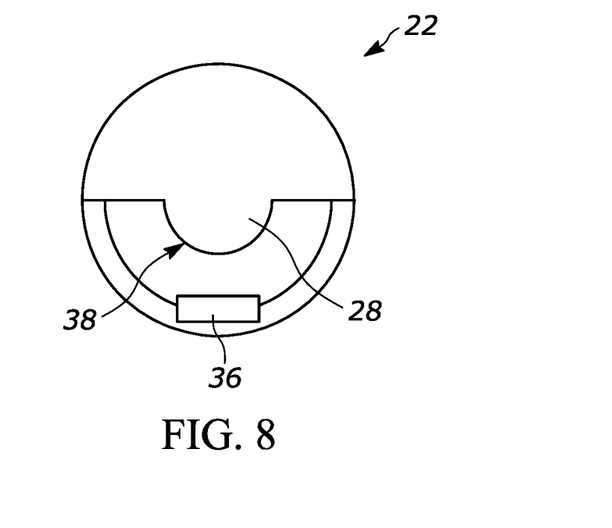
FIG. 8 is a top view of an example blocker covering openings in the example speaker assembly.
Figure 9:
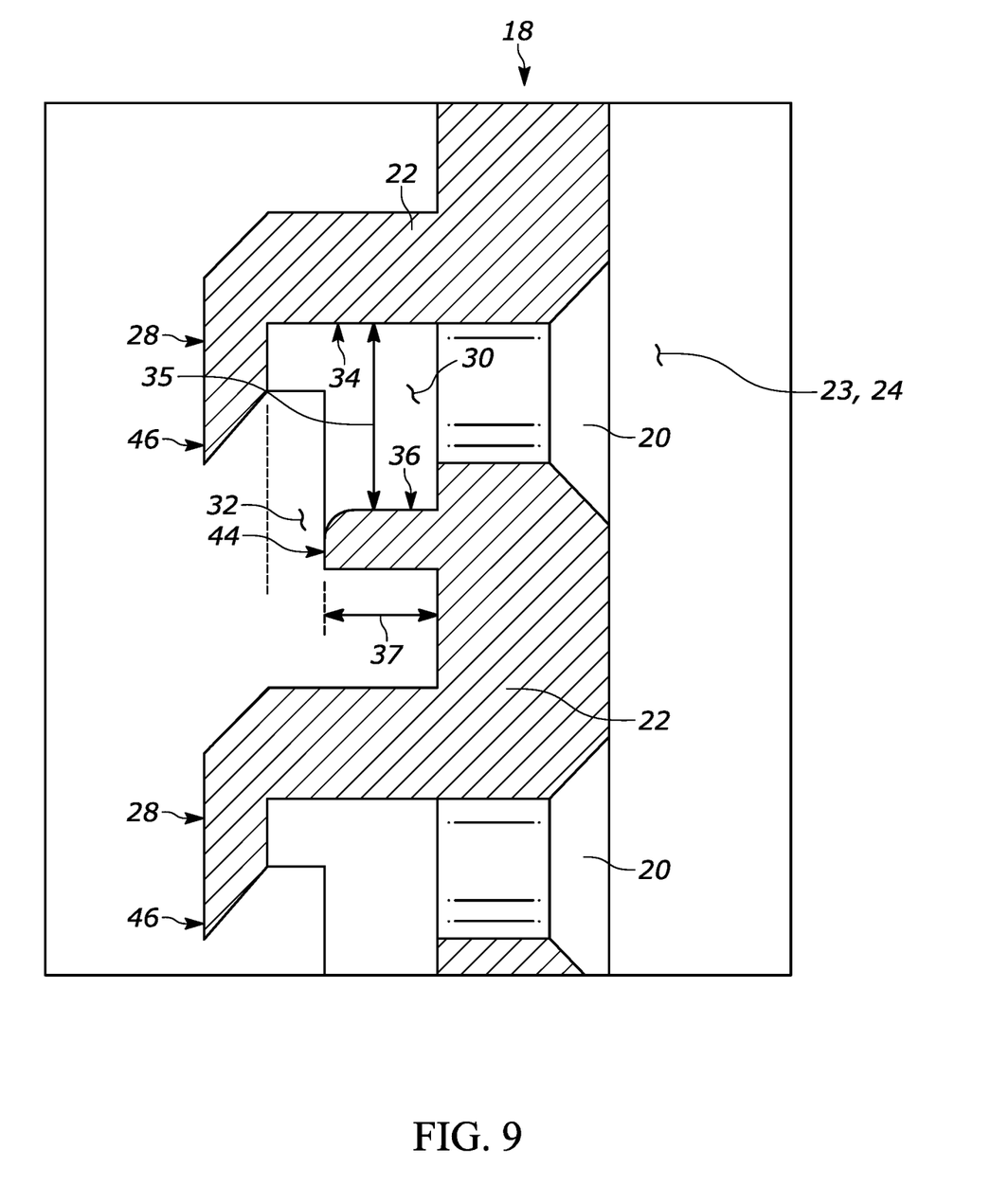
FIG. 9 is a cross-sectional view of an example cover for a speaker assembly.

Referring to FIGS. 7, 8 and 9 within continued reference to FIG. 4, each of the example blockers 22 includes a front face 28 disposed at the end of a first side wall 34. The front face 28 extends transverse from the first side wall 34 to cover the opening 20. The opening 20 is open to a passage that includes a first portion 30 and a second portion 32. The first portion 30 is defined between the first side wall 34 and a second side wall 36. The second portion 32 is defined under the front face 28 and is transverse to the first portion 30. The front face 28 includes a radius 38 that corresponds with the radius of the opening 20. The front face 28 covers the opening 20 such that a jet of water cannot be directed through the opening and against the microphone/speaker 23, 24.

The second side wall 36 extends upward parallel to the first side wall 34 and transverse to the front face 28. The second side wall 36 is disposed on a side of the opening 20 opposite the first side wall 36. An end 44 of the side wall is set a distance 35 from the first side wall 34 and includes a length 37 that prevents a direct line from entering the opening 20. Instead, for any angle between the first wall 34 and the second wall 36, a turn is required. The required turn prevents the direct application of a water jet through the opening 20 and against the speaker 24. An end 46 of the front face 28 along with the end 44 of the second wall 44 provide blocking of any angular application of water from penetrating directly through the opening 20. As appreciated, any angular application of a water stream would either hit the end of the second side wall 36 or impact against the first side wall 34. Accordingly, the end 46 of the front face 28 and the end 44 of the second side wall 36 are orientated such that water will not directly penetrate through the cover 18.

Figure 10:
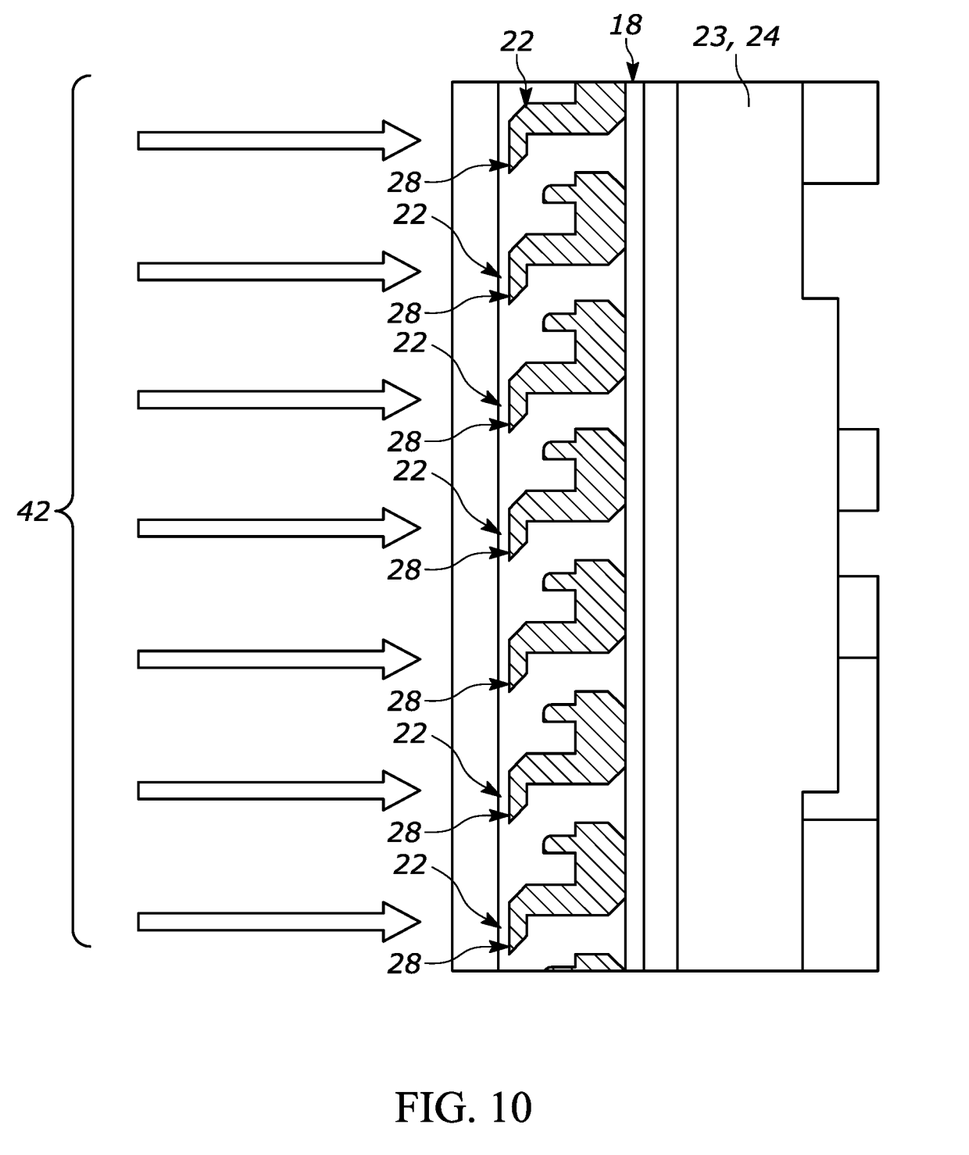
FIG. 10 is another cross-sectional view of an example cover for a speaker assembly.

Referring to FIG. 10, the cover 18 is shown in cross-section relative to a direct jet of water 42. The direct jets of water 42 will impact the front face 28 of each blocker 22 and drain downward away from the cover 18. Any water that may drip or drain through the cover 18 is not of sufficient pressure to impact operation of the waterproof speaker 24. Additionally, because the blockers 22 define a transverse but unblocked path for air, sound propagation from the microphone/speaker 23, 24 is unimpeded. Moreover, the unimpeded path for sound is such that the volume to/from the microphone/speaker 23, 24 is not muffled or otherwise reduced. Moreover, the path defined through the blocker 22 enables the generation and practical use of wider variety of sounds to/from the microphone/speaker 23, 24.

Accordingly, the example microphones assemblies 13*a-k* and speaker assemblies 14*a-k* includes a cover 18 that blocks the direct application of water pressure while providing an unblocked path for air that enables the unimpeded reception/propagation of sound.

Although an example embodiment has been disclosed, a worker of ordinary skill in this art would recognize that certain modifications would come within the scope of this disclosure. For that reason, the following claims should be studied to determine the scope and content of this disclosure.

What is claimed is:

1. A vehicle comprising:
 a mounting location on an external location of the vehicle;
 a microphone disposed within the mounting location for generating receiving sounds;
 a cover disposed over the speaker, the microphone including a plurality of openings for the transmission of sound and a corresponding plurality of blockers at each of the plurality of openings, each of the plurality of blockers includes a front face that is semi-circular with a radius corresponding to a radius of a corresponding one of the plurality of openings and is spaced apart forward of the corresponding one of the plurality of openings for blocking water intrusion.

2. The vehicle as recited in claim 1, wherein the blocker defines a passage between a corresponding one of the plurality of openings, the passage including a first portion that extends forward from the opening and a second portion that is transverse to the first portion.

3. The vehicle as recited in claim 2, wherein the blocker includes a first side and a second side that at least partially defines the first portion of the passage.

4. The vehicle instrument panel assembly as recited in claim 3, wherein the front face is disposed on the first side and extends over the first portion of the passage.

5. The vehicle as recited in claim 4, wherein the second side is shorter than the first side and the second portion of the passage is disposed between an end of the second side and the front face.

6. The vehicle as recited in claim 1, wherein the microphone is positioned to detect noise, vibration or harshness from vehicle components.

7. The vehicle as recited in claim 1, wherein the microphone is positioned to detect noise from the environment proximate to the vehicle.

8. An external microphone assembly for a vehicle, comprising:
 a microphone for detecting sounds;
 a cover disposed over the microphone, the cover including a plurality of openings for the transmission of sound and a corresponding plurality of blockers at each of the plurality of openings, each of the plurality of blockers includes a front face that is semi-circular with a radius corresponding to a radius of a corresponding one of the plurality of openings and is spaced apart forward of the corresponding one of the plurality of openings for blocking water intrusion.

9. The microphone assembly as recited in claim 8, wherein the blocker defines a passage between a corresponding one of the plurality of openings, the passage including a first portion that extends forward from the opening and a second portion that is transverse to the first portion.

10. The microphone assembly as recited in claim 9, wherein the blocker includes a first side and a second side that at least partially defines the first portion of the passage.

11. The microphone assembly as recited in claim 10, wherein the front face is disposed on the first side and extends over the first portion of the passage.

12. The microphone assembly as recited in claim 11, wherein the second side is shorter than the first side and the second portion of the passage is disposed between an end of the second side and the front face.

13. The microphone assembly as recited in claim 8, wherein the microphone is positioned to detect noise, vibration or harshness from vehicle components.

14. The microphone assembly as recited in claim 8, wherein microphone is positioned to detect noise from the environment proximate to the vehicle.

* * * * *